United States Patent [19]

Hiestand

[11] Patent Number: 4,572,524
[45] Date of Patent: Feb. 25, 1986

[54] POWER CHUCK
[75] Inventor: Karl Hiestand, Pfullendorf, Fed. Rep. of Germany
[73] Assignee: SMW Schneider & Weisshaupt GmbH, Fed. Rep. of Germany
[21] Appl. No.: 607,620
[22] Filed: May 7, 1984
[30] Foreign Application Priority Data
May 7, 1983 [DE] Fed. Rep. of Germany ....... 3316770
[51] Int. Cl.$^4$ ............................................. B23B 31/14
[52] U.S. Cl. ................................... 279/1 C; 279/110; 279/121
[58] Field of Search ................ 279/1 C, 110, 119, 121

[56]  References Cited
U.S. PATENT DOCUMENTS

| 4,097,053 | 1/1978 | Steinberger | 279/1 C |
| 4,240,645 | 12/1980 | Rohm | 279/1 C |
| 4,275,892 | 6/1981 | Rohm | 279/1 C |
| 4,431,201 | 2/1984 | Morisaki | 279/1 C |

Primary Examiner—Donald R. Schran
Attorney, Agent, or Firm—McGlew and Tuttle

[57]  ABSTRACT

A power operated chuck comprises a rotatable chuck body having a plurality of clamping jaws which are radially movably mounted on the chuck body. An axially movable piston on the chuck body is moved by a moving mechanism which includes several hooks or hook members having wedge-shaped interengaging surfaces for effecting relative movement therebetween. The chuck body has a plurality of recesses with counterweights which are slidably movable or pivotally movable in the recesses. The cover covers the recess adjacent an end of the chuck body. A pressure member alongside each of the counterweights is laterally offset relative to the center of gravity of the associated counterweights and is mounted in the chuck body for rotary movement in a manner such that the centrifugal forces produced by rotation of the counterweights at the chuck body are applied against the exterior of the piston adjacent the wedge-shaped portion of the hooks.

11 Claims, 3 Drawing Figures

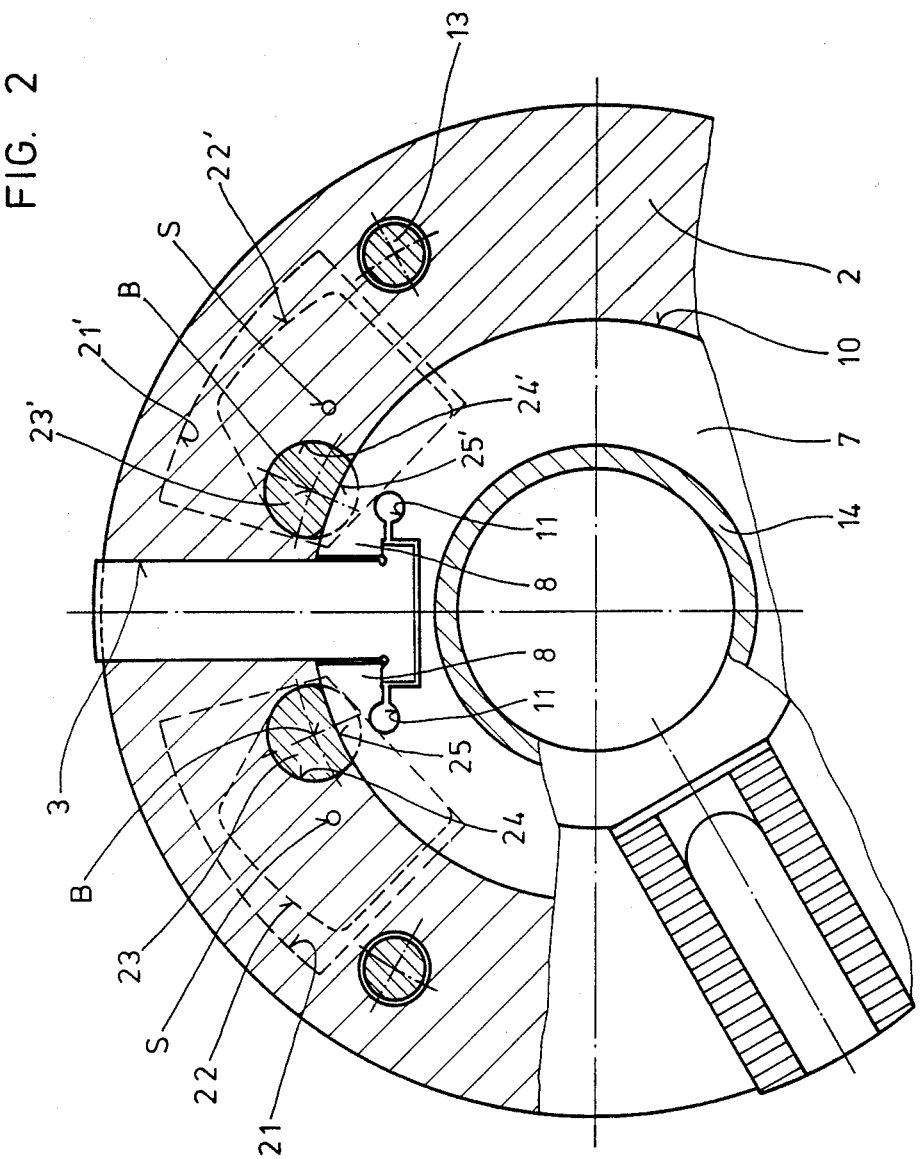

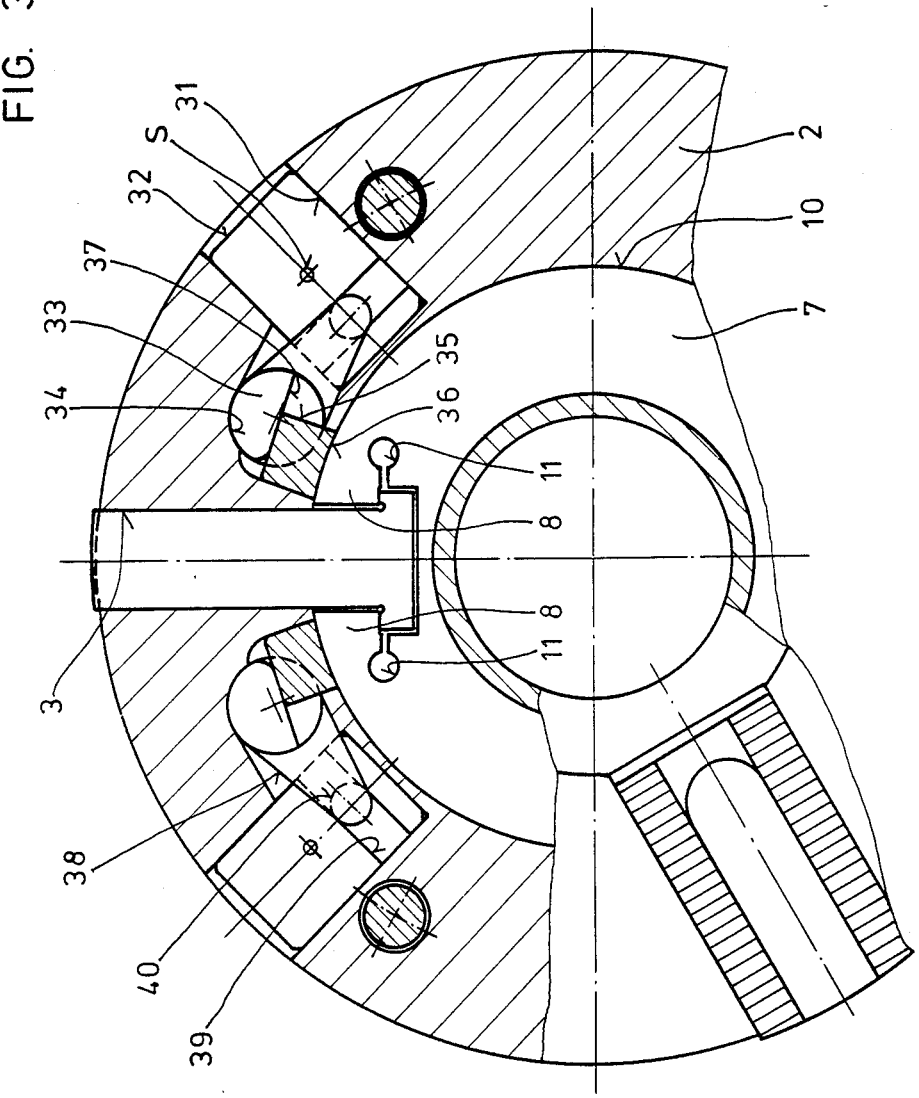

POWER CHUCK

FIELD AND BACKGROUND OF THE INVENTION

This invention relates in general to chucks for holding tools and in particular to a new and useful power operated chuck which includes radially movable clamping jaws.

Such power chucks, also termed wedge hook chucks, are known in a variety of designs and have proved satisfactory in practice. To equalize the centrifugal forces produced in the clamping jaws at high speeds and reduce an inwardly directed static clamping force or considerably augment an outwardly directed clamping force, it is known to provide balancing elements which are guided in the chuck body as counterweights and operatively connected to the jaws through hinged levers. The principal drawback of these constructions is that the static clamping forces acting on the clamped workpiece before and after a machining operation are not equal to each other and differ sometimes considerably. That is, as the chuck rotates at high speeds, the clamping force transmitted from the clamping piston through the wedge hooks to the jaws becomes almost counterweighted by the produced centrifugal forces and the elasticity of the coupled parts. Then, a part of the clamping force is produced by the balancing elements which are connected to the jaws through reversing levers. The clamping piston coupled to the jaws through the mating surfaces of the wedge hooks is thereby relieved and displaced, even though very little, by the action of a connected servo-mechanism which continues to be effective. In addition, the centrifugal forces expand the chuck body, so that the bore receiving the clamping piston is enlarged, with the result that the no longer backed-up wedge hooks can yield, which causes a further displacement of the clamping piston. However, after a machining operation is terminated, the chuck body contracts again, whereby the wedge hooks are pressed inwardly and the clamping force on the workpiece is augmented since the clamping piston does not retract, it is held fast in its displaced position. In consequence, the clamping force may increase considerably and often leads to a deformation of the workpiece.

SUMMARY OF THE INVENTION

The invention is directed to a chuck with jaws actuable through an axially displaceable clamping piston, which has a small overall length and is highly reliable in operation and is suitable not only for strong clamping forces but also for balancing the centrifugal forces with simple means and preventing an overtravel of the clamping piston, so that the static clamping force is not increased after the machining operation. The clamping piston is rather to be securely retained in its position by forces increasing as a function of the rotation of the chuck, and the expansion of the chuck body is compensated for so as to avoid undesirable displacements of the jaws. At the same time, the manufacturing costs are minimized.

In accordance with the invention, a power operated chuck includes a rotatable annular chuck body with a plurality of clamping jaws which are radially movably mounted in the body. A piston is actually movable on the chuck body by a piston moving mechanism which includes two hook members having wedge shaped interengaging surfaces. The chuck body has a plurality of recesses and a counterweight is slidable in each of the recesses. A cover covers one end of the chuck body and the recesses. A pressure member alongside each of the counterweights is laterally offset in respect to the center of gravity of each of the assocaited counterweights and is mounted in the chuck body for rotary movement such that the centrifugal forces produced by rotation of the counterweights are applied against the exterior of the piston adjacent the wedge-shaped portion of the hooks. The pressure members are formed integrally with the counterweights and form the bearing element of the counterweights.

Advantageously the pressure members connected to the counterweights are provided on their side facing the clamping piston with a bearing area which is conformable to the outer surface of the clamping piston. The counterweights are advantageously coupled to the pressure member through a pivotally mounted level having one end firmly connected to the pressure member and another end guided for displacement in the groove which is provided in the counterweight. The pressure member advantageously bears against a clamping piston to a pressure strip which is inserted between the pressure member and the clamping piston. The pressure strip advantageously has a pressure area which is conformable to the outer surface of the clamping piston. In accordance with one embodiment of the invention, the recesses accommodating the counterweights are all provided at the one end of the chuck body and covered by a cover which faces the respective clamping jaw. The pressure members are advantageously designed as bolts which projects from the counterweights in the direction of the clamping jaws and bear against the clamping piston by their free ends directly or through intermediate members such as the pressure strips.

The hooks advantageously make up the wedge mechanism which are associated with the centrifugal weight which is received in a recess provided in the chuck body or the cover is displaceable outwardly and which is positively coupled through a pressure member which is pivotal in the chuck body and secured to the centrifugal weight. The coupling is to an intermediate member which is displaceable inwardly parallel to the jaws and which in the zone of the wedge hooks of the jaws bear by their inner surface against the outer surface of the clamping piston.

Advantageously, the counterweights are a mass such that the center of gravity spaced from the pivotal axis of the fulcrum of the pressure member. The arrangement is preferable to effect an effort arm of the lever connecting the counterweights to the pressure member and a distance between the pivotal axis of the fulcrum of the pressure member and the area bearing against the wedge hook of the chuck such that with an increase in the speed range of the chuck the force exerted by a jaw on the wedge hook of the clamping piston corresponds to the force exerted on the wedge hook by the associated pressure member. The wedge hooks are advantageously made of elastic deformable material and they are made deformable by having recesses in the form of bores and slots, etc. adjacent their sides.

The inventive chuck is inexpensive, highly reliable in operation, and resistant to deformation and, primarily, automatically compensates for the centrifugal forces acting on the jaws, without increasing the static clamping forces after a machining operation is terminated, which forces, in prior art designs, are caused by a deformation of the wedge hooks of the clamping piston. That is, if radially movable counterweights are provided adjacent the clamping jaws, and the centrifugal forces thereby produced during the rotation of the chuck are directed through pressure members to bear against the clamping piston in the area of the wedge hooks, the wedge hooks cannot deform and the clamping piston cannot become displaced. The static clamping force thus remains unchanged after the termination of a machining operation, and the centrifugal forces acting on the jaws are reliably equilized, since the centrifugal forces produced by the counterweights also act on the wedge hooks of the clamping piston, only in the opposite direction. Deformations of the workpiece are thereby securely avoided and the clamping forces remain constant under varying speeds and also at standstill.

Accordingly, it is an object of the invention to provide an improved chuck which includes a counterweight arrangement which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a cross-sectional view taken along the line 2—2 of FIG. 1, and

FIG. 3 is a view similar to FIG. 2 of another embodiment showing the counterweights designed as radially displaceable elements linked to the pressure member.

DESCRIPTION OF THE PREFERRED EMBODIMENTS

Figure 1:
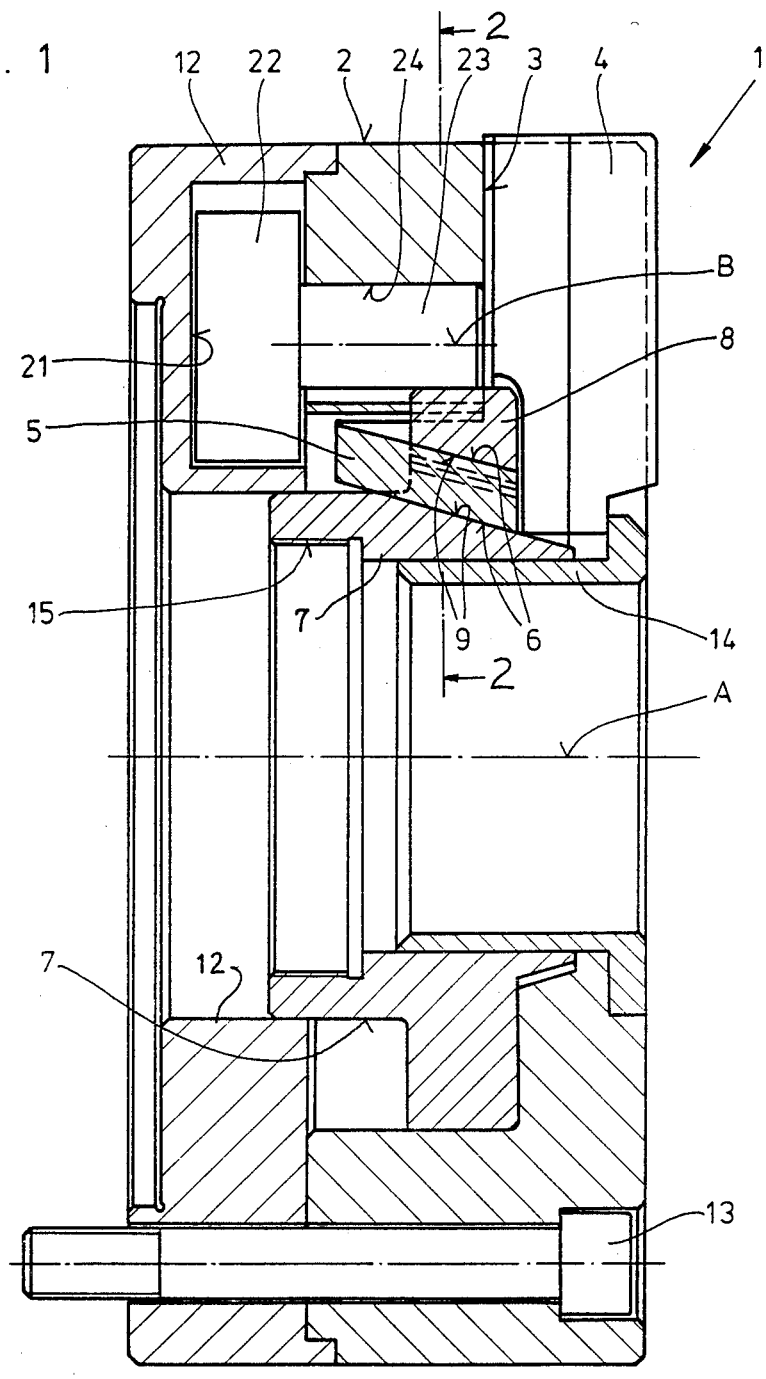
FIG. 1 is a longitudinal sectional view of a wedge bar chuck actuable by a clamping piston.

Referring to the drawings in particular the invention embodied therein comprises a power operated chuck 1 which includes a rotatable chuck body 2, and clamping or master jaws which are guided in radial grooves 3 and actuable by an axially movable clamping piston 7 through respective wedge mechanisms. For this purpose, mutually engaging wedge hooks 5 and 8 are provided on jaws 4 and the clamping piston, having wedge surfaces 6 and 9, which slant toward the longitudinal axis A of chuck 1. In this way, the axial displacement of clamping piston 7 effected by a servo-drive through a connecting member screwed into thread 15, is transformed into a radial displacement of jaws 4.

Chuck body 2 is closed on its rear side by a cover 12 and secured to the spindle of a machine tool by screws 13. The grooves 3 in which jaws 4 are received are guarded at the inside by a bushing 14 inserted in chuck body 2.

To compensate for the centrifugal forces produced by jaws 4 as chuck 1 rotates, and, in addition, to hold clamping piston 7 firmly in its respective position, counterweights 22, 22' are inserted in recesses 21,21' which are provided in cover 12 at either side of each of the jaws 4. The centrifugal forces acting on the counterweights are redirected to bear through pressure members 23, 23' which are mounted for swiveling or pivoting in bores 24,24' of chuck body 2, against the outer surface 10 of clamping piston 7, in the area of elastically deformable wedge hooks 8. For this purpose, pressure members 23, 23' have a pressure area 25,25' which is conformable to the outer shape of clamping piston 7. The elastic deformability of wedge hooks 8 is augmented by undercutting recesses 11 in piston 7, so that fractures of wedge hooks 8 are forestalled.

In the embodiment of FIG. 2, the counterweights 22, 22' are mounted for pivoting about an axis B which coincides with the central axis of pressure members 23, 23'. With chuck 1 in rotary motion, counterweights 22, 22' produce centrifugal forces which react to oppose the centrifugal forces produced by jaws 4. Since wedge hooks 8 of clamping piston 7 are thus exposed to opposite forces, they are not deformed and clamping piston 7 cannot change its position during a machining operation. Consequently, nothing can change the applied static clamping force after the machining operation is terminated and chuck 1 is stopped.

The distance between the center of gravity S of counterweights 22, 22' and their pivotal axis B, or pressure area 24, 24', and the mass of the counterweights are sized to obtain, within a certain speed range of chuck 1, substantially equal forces from both sides, applied to wedge hooks 8 of clamping piston 7. An equilibrium is thus ensured.

In the embodiment of FIG. 3, radially displaceable counterweights 32 are received in recesses 31 which are provided at either side of jaws 4. Each counterweight 32 is coupled through a lever 38 to a pressure member 33 which is pivotally mounted in a bore 34 of chuck body 2. One end of lever 38 is guided through a projecting stud 40, for displacement in a groove 39 which is provided in counterweight 32, while its other end is rigidly secured to pressure member 33. In addition, a pressure strip 35 is inserted in a recess 37 of pressure member 33, which strip has a contact area 36 conformable to the opposite outer surface of clamping piston 7, through which it bears against the piston in the zone of wedge hook 8. The centrifugal forces produced by counterweights 32 may be magnified through the mechanical advantage provided by lever 38, so that small masses of the counterweights are satisfactory.

While specific embodiments of the invention have been shown and described in detail to illustrate the application of the principles of the invention, it will be understood that the invention may be embodied otherwise without departing from such principles.

What is claimed is:

1. A power operated chuck, comprising a rotatable chuck body having a longitudinal axis, a plurality of clamping jaws radially movably mounted to said chuck body, a piston axially movable on said chuck body parallel to said longitudinal axis, a jaw moving mechanism on said piston including first and second hook members each having a wedge-shaped surface which is inclined to the longitudinal axis and engaged with one of said jaws, said chuck body having a plurality of recesses, a counterweight movable in each of said recesses, a cover covering said chuck body and overlying said recesses, a pressure member alongside each of said counterweights laterally offset relative to a center of gravity of each of said counterweights and engaged therewith and mounted in said chuck body for rotary movement about an axis which is eccentric to said center of gravity and which is parallel to the longitudinal axis in a manner such that the centrifugal forces produced by rotation of said chuck body move said counterweights radially and are applied against an exterior of said piston adjacent the wedge-shaped portions and against said hook members.

2. A power operated chuck according to claim 1, including an intermediate strip member located between said counterweights and said clamping piston being movable by movement of said counterweights against said clamping piston, said pressure members being formed integrally with said counterweights providing a bearing element of said counterweights.

3. A power operated chuck, according to claim 1, wherein said pressure members are provided on a side facing said clamping piston with a bearing area conformable to the outer surface of said clamping piston.

4. A power operated chuck according to claim 1, wherein said counterweights are movable in associated recess in a radial direction, a pressure member coupled with said counterweights, a lever member pivotally coupling said coupling pressure member to said counterweights having one end firmly connected to said pressure member and the other end guided for displacement in said counterweight, said counterweight having a groove accommodating said pressure member.

5. A power operated chuck according to claim 1, including a pressure strip between said pressure member and said clamping piston against which said pressure member bears.

6. A power operated chuck according to claim 5, wherein said pressure strip has a pressure area which is conformable to the outer surface of said clamping piston.

7. A power operated chuck according to claim 1, wherein said recesses accommodating said counterweights are all provided on said chuck body adjacent an end thereof, said cover covering said recesses, said pressure members comprising bolts projecting from said counterweights toward said clamping jaws and bearing against said clamping piston.

8. A power operated chuck according to claim 1, wherein each of said hooks is associated with a centrifugal weight in a respective recess and is displaceable outwardly and positively coupled through said pressure member to a respective weight, said pressure member being tiltable in said chuck body, an intermediate member connected to said pressure member displaceable parallel to the movement of said jaws bearing by an inner surface thereof against the outer surface of said clamping piston at a location adjacent said hook members.

9. A power operated chuck according to claim 1, wherein the recesses for the weights is conformable to the outer surface of said chuck body and a cover covering said chuck body.

10. A power operated chuck according to claim 1, wherein said counterweight has a mass with a center of gravity spaced from the pivotal axis of the fulcrum of the pressure member such that the pressure bearing against said hook member is such that with an increase of the speed range of the chuck, the force exerted by the jaw and hook member of the clamping piston corresponds to the force exerted on the hook member by the associated pressure member.

11. A power operated chuck according to claim 1, wherein said hook members are elastically deformable and have openings therein permitting their deformation of their surface.

* * * * *